W. CHURCHILL.
HEADLIGHT AND SIGNAL LAMP.
APPLICATION FILED NOV. 29, 1910.
1,057,935.
Patented Apr. 1, 1913.
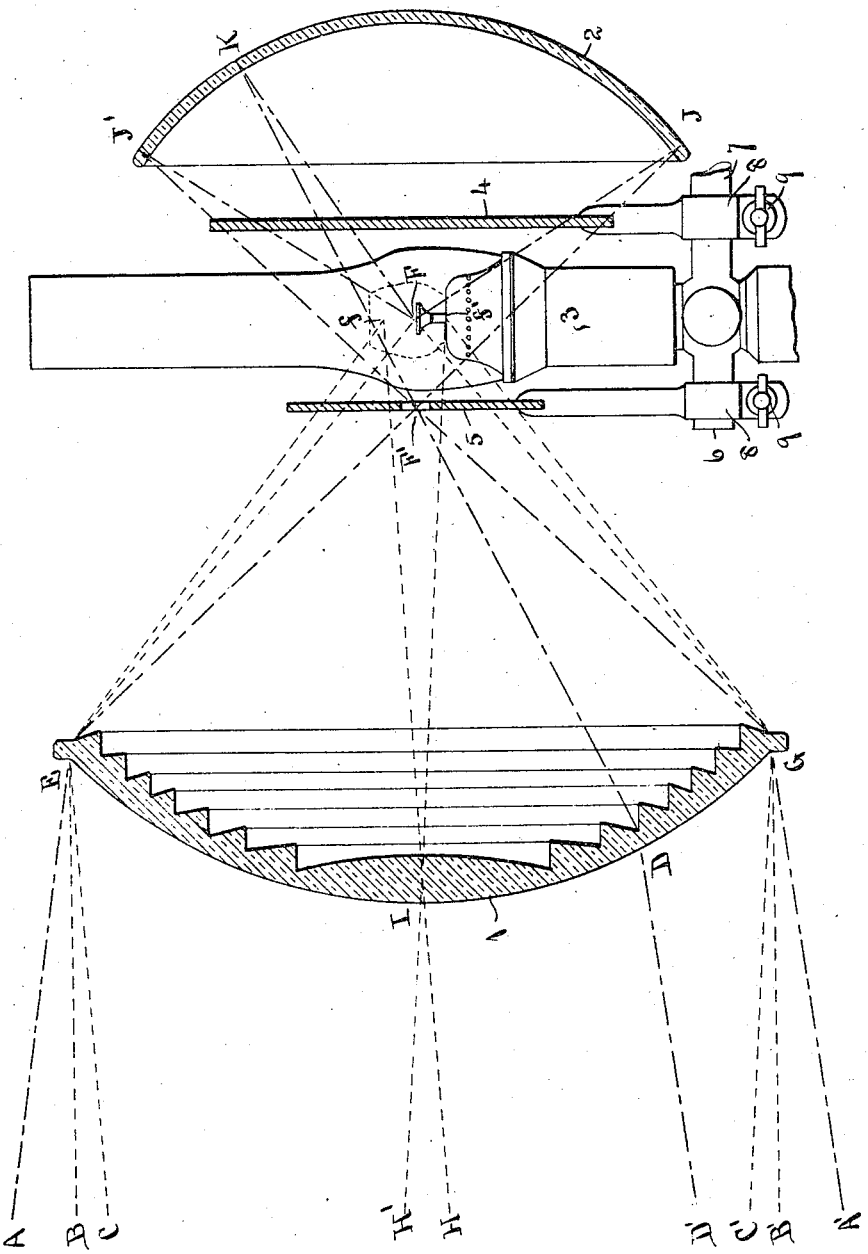
WITNESSES:
M. E. Verbrek.
INVENTOR
William Churchill
BY
Eugene Diven
ATTORNEY

UNITED STATES PATENT OFFICE.

WILLIAM CHURCHILL, OF CORNING, NEW YORK.

HEADLIGHT AND SIGNAL-LAMP.

1,057,935.  Specification of Letters Patent.  Patented Apr. 1, 1913.

Application filed November 29, 1910. Serial No. 594,766.

*To all whom it may concern:*

Be it known that I, WILLIAM CHURCHILL, a citizen of the United States, residing at Corning, in the county of Steuben and State of New York, have invented certain new and useful Improvements in Headlights and Signal-Lamps, of which the following is a specification.

This invention relates to improvements in the arrangement of lenses and reflectors in headlights for use upon locomotives, automobiles and the like, and in signal-lamps for semaphore and other uses, where it is desirable not only to project the beam of light to a distance in front of the vehicle or signal, but also to disperse a portion of the light rays so as to produce a wider angle of illumination over the immediate foreground; and my object is to provide an arrangement of this character whereby independent beams of parallel and diverging rays may be projected from the headlight or signal-lamp at the same time; or the one or the other beam cut out, as may be desired.

I attain my object by combining a lens and reflector with the source of light in the manner illustrated in the accompanying drawing, in which the figure shows my lamp partially in vertical section and partially in side elevation.

In this illustration I have shown a Fresnel lens 1, properly positioned in front of the flame of a lamp 3 to project a beam of parallel rays: and back of the lamp is positioned a spherical reflector 2, so focused at F in the center of the flame, that a conjugate focus will be positioned at F' at a short distance in front of the flame. As so arranged the rays of light from the flame will be reflected from points on the reflector, such as J, K, J', through the focus F to the points E, D and G, respectively, on the lens; passing thence on lines divergent from the axis of the system in the directions E A, D D', and G A', respectively, while the direct rays passing from the focus F through the lens will pass out therefrom parallel to the axis, as indicated by the lines E B and G B'.

To produce the best results in this combination, I preferably make the lens in conformity with my Letters Patent #801,766, dated October 10, 1905, for improvement in lenses, whereby the rays issuing from the points $f$ and $f'$ at the top and bottom of the flame, respectively, will issue from the lens in convergent rays E C and G C', and from intermediate points in a like manner, to increase the brilliancy of the beam of light projected by the lens, I do not, however, limit myself to any particular form of lens.

While direct rays of light issuing from the flame, as from the points $f$ and $f'$ through the lens will produce a certain amount of divergence, as shown by the lines $f$ I H and $f'$ I H', respectively, the reflected rays issuing from the conjugate focus F' will give a greater divergence. Thus, in the relative arrangement of the parts, as illustrated, the lines I H and I H' have a divergence from the axis of but 4°, while the lines E A, D D' and G A' have a divergence of 8°. By moving the reflector nearer to the source of light this divergence may be increased as desired; the conjugate focus being thus moved closer to the lens and the angle of incidence increased. In any arrangement of the combination, when a spherical reflector is used, the center of curvature of such reflector lies on the axis midway between the points F and F', according to the well known optical laws of reflection.

With headlights, it will at times be desirable, under running conditions, to cut out the beam of divergent rays, so that objects at a distance may be clearly disclosed by the beam of parallel rays; and for this purpose I interpose an eclipsing screen 4, of metal or other suitable material, so hung or supported in the lamp that it may be moved into position to cut off the rays of light from the lamp to the reflector. By way of illustration, I have shown this screen as pivotally mounted upon a projection 7 from the lamp by means of a split ring 8, which is held in position by a clamping thumb screw 9. At other times it may be desirable to cut off the direct rays from the lens and utilize only the reflected rays which produce the divergent beam. To this end I provide a screen 5, having an aperture, the center of which coincides with the conjugate focus F', the screen being so positioned as to bring this focal point into central position therein. This screen is pivotally supported in like manner upon an arm 6 on the lamp.

While I have shown, for the purpose of illustration, the screens mounted as above described, I do not limit myself in any way to such an arrangement; nor do I limit myself to the use of a Fresnel lens and spherical reflector, although I believe this combination will be the most effective; nor to the combination of the lens and reflector with an oil lamp, as the source of illumination may be an acetylene flame, or an electric light, or any other. Nor do I limit myself to any special material for the reflector, as the reflector may be made of various kinds of metal, silvered glass or prismatic glass. The best results will be secured, however, by the use of silvered glass.

What I claim as my invention and desire to secure by Letters Patent is—

1. The combination with a source of illumination of a corrugated condensing lens arranged to project a beam of light of substantially parallel rays, a spherical reflector arranged to project a beam of more divergent rays produced by the combined action of reflector and lens, and a movable screen interposed between said source and the reflector for cutting off the divergent beam.

2. The combination, with a lens, a reflector and a source of illumination so arranged as to project beams of light of substantially parallel rays and of divergent rays, respectively, from the direct and reflected rays passing through the lens from the source of illumination, of a movable screen interposed between said source and the lens for cutting off the direct rays, said screen being positioned at a conjugate focus of the reflector and having an aperture at said focus for the passage of the reflected rays.

In testimony whereof I have affixed my signature, in presence of two witnesses.

WILLIAM CHURCHILL.

Witnesses:
M. E. VERBECK,
EUGENE DIVEN.